United States Patent [19]
Underhill

[11] Patent Number: 6,021,622
[45] Date of Patent: Feb. 8, 2000

[54] ROUND BALE WRAPPING APPARATUS

[75] Inventor: Kenneth R. Underhill, Strasburg, Pa.

[73] Assignee: New Holland North America, Inc., New Holland, Pa.

[21] Appl. No.: 09/334,808

[22] Filed: Jun. 17, 1999

Related U.S. Application Data

[60] Provisional application No. 60/090,049, Jun. 19, 1998.

[51] Int. Cl.$^7$ .............................. B65B 11/04; B65B 63/04
[52] U.S. Cl. .............................. 53/118; 53/587; 53/389.3; 53/389.4
[58] Field of Search .......................... 53/118, 587, 389.2, 53/389.3, 389.4, 389.5

[56]  References Cited

U.S. PATENT DOCUMENTS

| | | |
|---|---|---|
| 4,604,848 | 8/1986 | Clostermeyer . |
| 4,604,855 | 8/1986 | Krone et al. ........................... 53/587 X |
| 4,612,855 | 9/1986 | Wagstaff et all. . |
| 4,729,213 | 3/1988 | Raes ..................................... 53/587 X |
| 4,790,125 | 12/1988 | Merritt ..................................... 53/587 |
| 4,841,851 | 6/1989 | Quataert . |
| 4,956,968 | 9/1990 | Underhill . |
| 5,129,208 | 7/1992 | Van Zee ................................. 53/587 X |
| 5,243,806 | 9/1993 | Jennings et al. ...................... 53/587 X |
| 5,259,167 | 11/1993 | Underhill et al. .................. 543/587 X |
| 5,289,672 | 3/1994 | Underhill . |
| 5,365,836 | 11/1994 | Campbell .............................. 53/587 X |
| 5,581,973 | 12/1996 | Underhill . |
| 5,581,974 | 12/1996 | Underhill et al. ..................... 53/587 X |

FOREIGN PATENT DOCUMENTS

29612863  7/1996  Germany .

*Primary Examiner*—Daniel B. Moon
*Attorney, Agent, or Firm*—Frank A. Seemar; Larry W. Miller; J. William Stader

[57] ABSTRACT

A round baler having a tailgate, pivotally connected to a main frame, operative between a closed position during which a bale is being formed, and an open position during which a formed bale is being discharged. A sledge assembly, mounted on the main frame for movement between a bale starting position and a full bale position, has at least two transverse cylindrical rolls mounted in spaced relationship along an arcuate path. An apron, supported along a continuous path on the main frame and tailgate by a plurality of rotatable guide members, includes an inner course that cooperates with the transverse rolls on the sledge assembly to define a bale forming chamber. The apron is driven along a continuous path in the same direction as the outer surfaces of the transverse rolls. A dispensing assembly dispenses wrapping material into the bale forming chamber between the adjacent outer surfaces of the transverse rolls for wrapping the cylindrical package of crop material. Resilient transverse flaps extending from one of the transverse rolls intermittently contact the wrapping material as it is being dispensed into the chamber.

18 Claims, 6 Drawing Sheets

ROUND BALE WRAPPING APPARATUS

CROSS REFERENCE TO RELATED APPLICATION

This application claims the benefit of U.S. Provisional Application No. 60/090,049, filed Jun. 19, 1998, and entitled "Round Bale Wrapping Apparatus".

FIELD OF THE INVENTION

The present invention relates generally to agricultural baling machines and more particularly to a baler for producing cylindrical bales, commonly referred to as round bales, having improved wrapping apparatus for wrapping a cylindrical package of crop material formed in a bale forming chamber.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed in a continuous stream into a fixed or variable diameter chamber. The hay is rolled into a cylindrical package within the chamber, wrapped with twine, net or the like and ejected onto the ground for subsequent handling.

U.S. Pat. No. 5,289,672, issued Mar. 4, 1994 in the name of Kenneth R. Underhill, and, U.S. Pat. No. 4,956,968, issued Sep. 18, 1990, also in the name of Kenneth R. Underhill, disclose one type prior art round baler of the general nature described above. In this particular type of baler an expandable chamber is defined by a pair of fixed sidewalls, and a plurality of side-by-side belts cooperating with a series of transverse rolls, mounted between a pair of pivotally mounted arms. This arrangement of rolls and arms is commonly referred to as a sledge assembly. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber. Density of the bale can be affected by varying the force on the take up arms.

Another type prior art round baler of the same general nature employs a plurality of transverse rollers to define a cylindrical bale forming chamber with a fixed diameter. Examples of this type baler are shown in U.S. Pat. No. 4,612,855, issued Sep. 23, 1986 in the name of Robert A. Wagstaff, et al, U.S. Pat. No. 4,604,848, Aug. 12, 1986 in the name of Gerhard Clostermeyer, and U.S. Pat. No. 4,841,851, issued Jun. 2, 1989 in the name of Pierre Quataert. It should be noted that the '851 patent shows additional embodiments wherein a fixed chamber is defined by means other than rolls, i.e., belts (FIG. 7) or chains and slats (FIG. 8).

The present invention relates to a wrapping system for a round baler in which a cylindrical package of crop material is formed in a fixed or expanding chamber wherein one or more transverse forming rollers are employed. For example, the chamber could comprise fixed side walls and expandable transverse elements consisting of a combination of belts and rolls of the general nature described in the '672 patent, cited above. This is one example of the many prior art patents assigned to the assignee, New Holland North America, Inc., that disclose this type of expandable chamber round baler. It is not uncommon in prior art round balers having this general configuration to feed the wrapping material between a pair of transverse rollers. Alternatively, the chamber could comprise fixed side walls and transverse elements at fixed locations in a configuration of the general nature described in the '855 patent, cited above.

Unique characteristics of the present invention, described below, contribute to a wrapping system for round balers that consistently introduces wrapping material to the periphery of the cylindrical package formed in the chamber regardless of whether the diameter of the chamber is fixed or variable, and regardless of the nature of the transverse wall, i.e., belts, rolls or chains.

The present invention relates to several features of wrapping apparatus for round balers of the general nature described in the preceding paragraph. These unique features, described below, contribute to improved performance and operability of round balers. Additionally, these features are consistent with lower manufacturing costs without detracting from simplicity of field operation and serviceability.

SUMMARY OF THE INVENTION

Accordingly, one object of the present invention is to provide a round baler wrapping system that consistently initiates the wrapping function.

Another object of the present invention is to provide improved wrapping apparatus for round balers having a bale forming chamber defined by two or more transverse rolls.

A further object of the present invention is to provide a system for consistently introducing round baler wrapping material to the bale forming chamber regardless of the type of wrapping medium.

Still another object of the present invention is to provide a system for consistently introducing round baler wrapping material to a bale forming chamber regardless of whether the chamber has a fixed or variable diameter.

In pursuance of these and other important objects the present invention contemplates improved wrapping apparatus in a round baler that forms crop material into cylindrical bales. In one embodiment the baler comprises a main frame, a tailgate pivotally connected to the main frame, the tailgate being operative between a closed position during which a bale is being formed, and an open position during which a formed bale is being discharged, A sledge assembly is mounted on the main frame for movement between a bale starting position and a full bale position. The sledge assembly includes two transverse rolls having a crop engaging surface extending transversely of the main frame, and means for mounting the two transverse rolls in spaced adjacent relationship. The rolls each have a generally cylindrical outer surface defining a transverse slot therebetween. The baler further comprises an apron supported along a continuous path on the main frame and on the tailgate by a plurality of rotatable guide members, which apron path has an inner course that cooperates with the conveying means on the sledge assembly to define a bale forming chamber. Drive means move the apron along such continuous path, and rotate the two transverse rolls such that the outer surfaces thereof move in the same direction of travel as the apron. A supply of wrapping material is dispensed into the chamber through the slot between the two transverse rolls for wrapping the outer surface of the cylindrical package of crop material to form a round bale. More particularly the invention contemplates feed assist means associated with one of the two transverse rolls for intermittent contact with the wrapping material to urge it toward the bale forming chamber as it is being dispensed through the slot.

The invention also contemplates a round baler for forming crop material into cylindrical bales comprising in combination a main frame, a plurality of conveying elements supported on the main frame for defining a bale forming chamber, the conveying elements each having a crop engaging surface extending transversely of the main frame, the conveying elements comprising at least two transverse rolls mounted in spaced relationship along an arcuate path, the rolls each having a generally cylindrical outer surface, means for rotating the transverse rolls such that the outer surfaces thereof move in the same direction of travel, a supply of wrapping material, a dispensing assembly including means for dispensing wrapping material from the supply of wrapping material into the chamber between the transverse rolls for wrapping the outer surface of the cylindrical package of crop material to form a round bale of crop material, a pickup for feeding crop material into the chamber, and feed assist means extending from one of the transverse rolls for intermittent contact with the wrapping material as it is being dispensed into the chamber under conditions where the outer surface of a cylindrical package of crop material is being wrapped in the chamber.

The foregoing and other objects, features and advantages of the invention will appear more fully hereinafter from a consideration of the detailed description which follows, in conjunction with the accompanying sheets of drawings wherein the principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
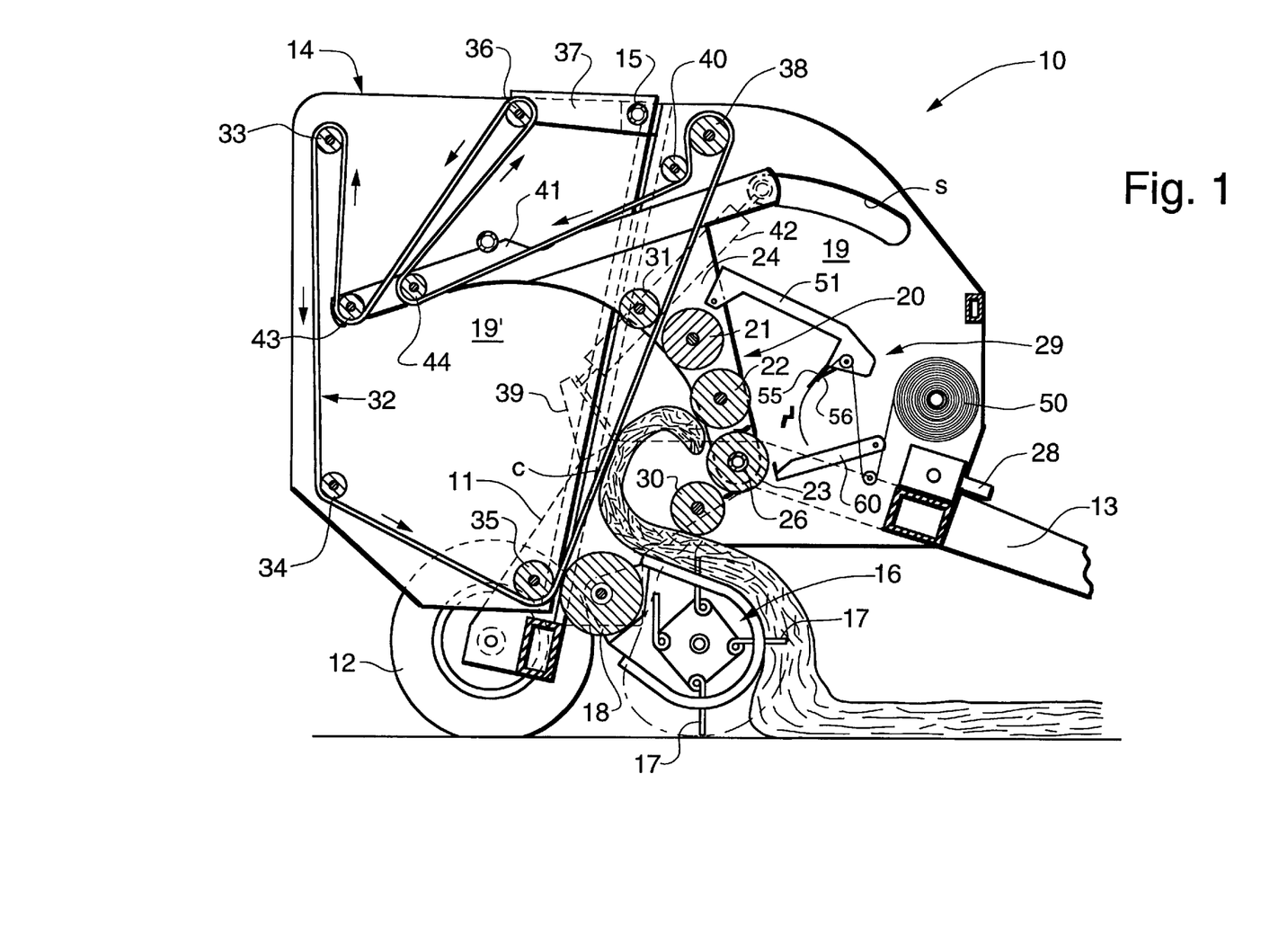
FIG. 1 is a cross sectional diagrammatic side elevational view of a round baler in which the present invention is incorporated. The tailgate is in the closed position and the elements of the bale forming chamber are shown in their core starting condition.

Referring to the drawings for a detailed description of the preferred embodiment of the invention, FIG. 1 shows the cross section of a round baler 10 of the type in which the present invention is readily embodied. Baler 10 has an expandable bale forming chamber defined in part by belts and rolls. This type of expandable chamber is disclosed in various prior art patents, e.g., U.S. Pat. No. 4,956,968 mentioned above, which is hereby incorporated by reference. It should be noted that throughout this description the drawings are diagrammatic in nature to best show the elements of the baler in which the invention is embodied. To this end, in many instances only one element in a pair is shown, especially in those cases where identical elements exist, disposed on opposing sides of the baler, e.g., wheels.

Baler 10 has a main frame 11, comprising a plurality of rigid structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes walls 19' coplanar with side walls 19. A pickup 16, mounted on main frame 11, has a plurality of tines 17, the tips of which are movable along a predetermined path to lift crop material from the ground and deliver it rearwardly along a generally horizontal path toward a floor roll 18, rotatably mounted on main frame 11.

An expandable chamber for forming bales is defined by side walls 19', 19, belts, and a sledge assembly 20, operative between the inwardly facing surfaces of such walls. Sledge assembly 20 comprises a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31 carried between arms 24, commonly referred to as a follower roll.

Net wrapping apparatus, generally designated by reference numeral 29 in FIGS. 1–4, is mounted between walls 19 on main frame 11 and sledge assembly 20 forwardly of the bale forming chamber. Net is dispensed from a supply roll 50 to the chamber via an opening between rolls 22 and 23 in a manner described in detail below. Similar mechanisms for dispensing wrapping material are shown in U.S. Pat. Nos. 4,956,968 and No. 5,289,672, mentioned above.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and follower roll 31, it is in engagement only with follower roll 31 and not roll 21. In addition to its bale forming function, roll 21 also serves to strip crop material from the belts, and is commonly referred to as a stripper roll.

Suitable coupling means (not shown) connected to drive shaft 28 provide for rotation of drive roll 38. This causes movement of apron 32 along its varying paths in the directions indicated by the arrows in FIGS. 1, 2 and 3. An additional guide roll 40 in the main frame 11 ensures proper driving engagement between the surfaces of the belts of apron 32 and the surface of drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by tension spring 42, mounted between one of arms 41 and main frame 11 by bracket assembly 39, affixed to main frame 11. Spring 42, mounted outwardly from wall 19, is pivotally secured to arm 41 by journal means extending through access slot s in side wall 19. While one function of spring 42 is to return the sledge and takeup assemblies to the start position after a bale is discharged, another equally as important function is to provide a force on sledge assembly 20 that resists expansive forces on the chamber.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

Figure 2:
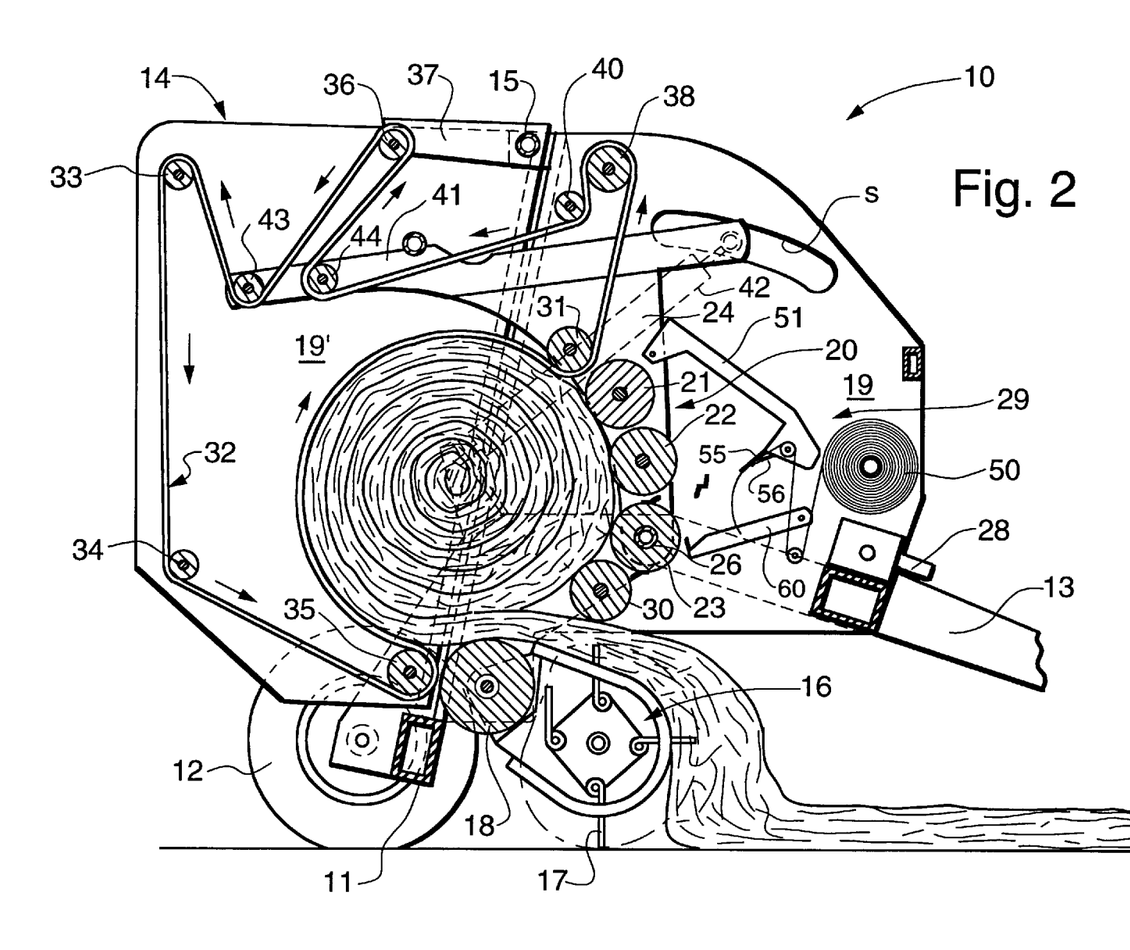
FIG. 2, generally similar to FIG. 1, is a cross sectional diagrammatic side elevational view of a round baler in which the tailgate is in the closed position and the elements of the bale forming chamber are shown in an intermediate bale forming condition.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding by pickup tines 17 of crop material into the bale forming chamber in a generally spiral fashion causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described, it is wrapped by wrapping apparatus 29, utilizing either twine, plastic or net to encompass the package and form a round bale. Tailgate 14 is then opened and the completed bale is ejected rearwardly as shown in FIG. 4. Subsequent closing of tailgate 14 returns the inner and outer courses of apron 32 to the locations shown in FIG. 1.

Figure 3:
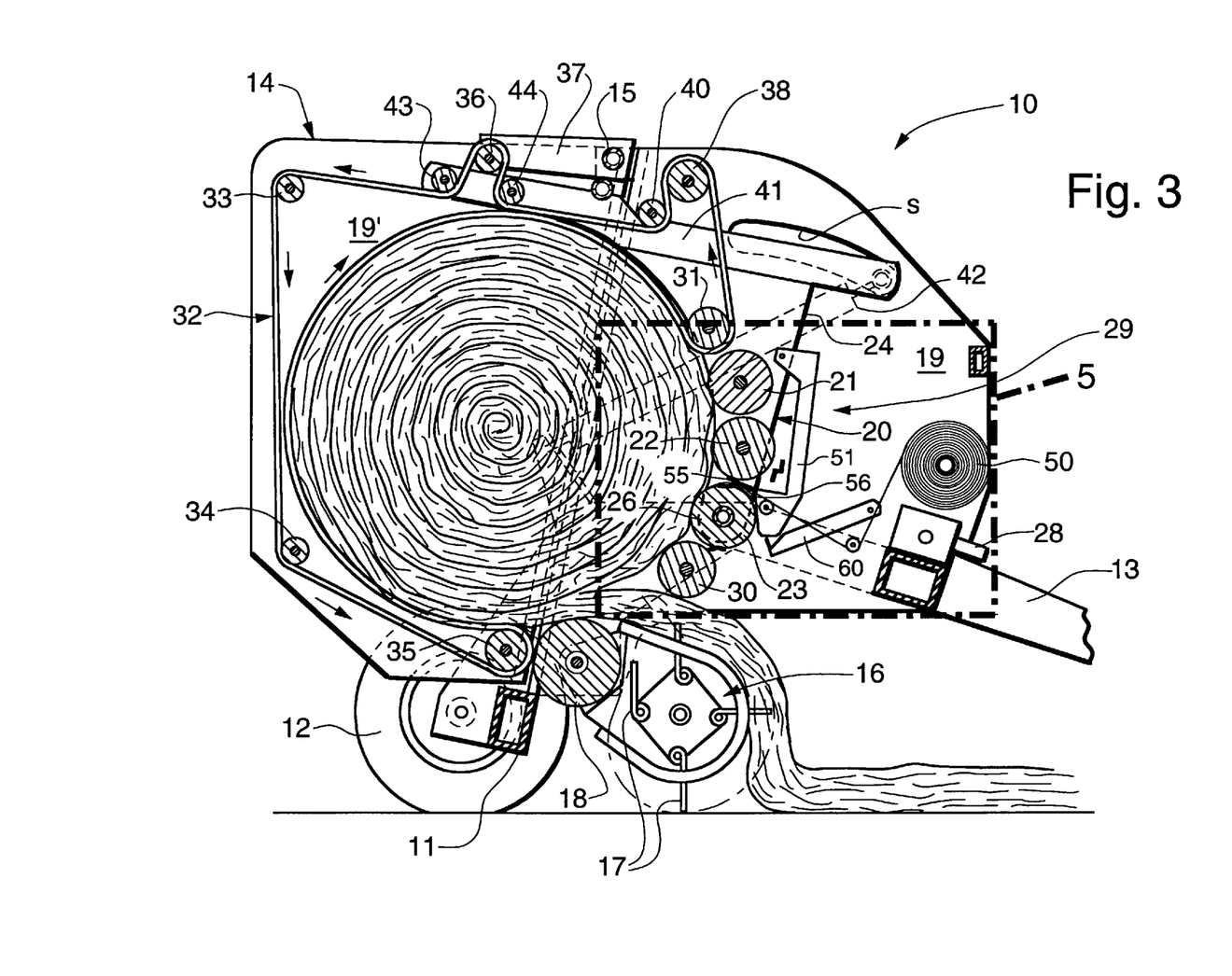
FIG. 3, also generally similar to FIG. 1, is a cross sectional diagrammatic side elevational view of a round baler in which the tailgate is in the closed position and the elements of the bale forming chamber are shown in the full bale condition.
Figure 4:
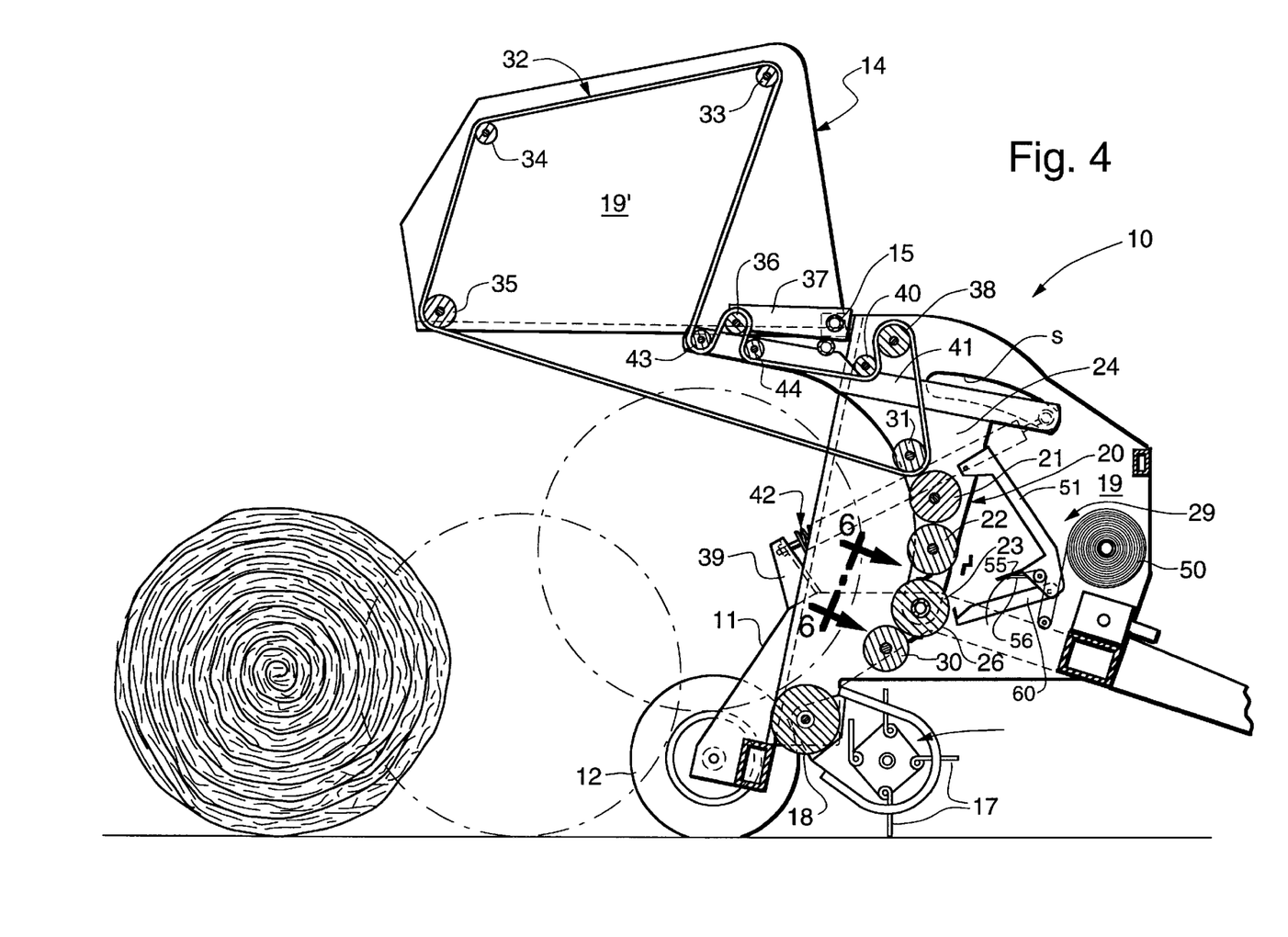
FIG. 4, also a cross sectional diagrammatic side elevational view of a round baler, shows the tailgate in the open position and the elements of the bale forming chamber after a bale has been discharged.

During bale formation, sledge assembly 20, along with the above described integral take up assembly, moves between a bale starting position (FIG. 1) to a full bale position (FIG. 3). This movement of sledge assembly 20 causes idler roll 31 to move along a generally arcuate path while maintaining apron 32 in close proximity to roll 21, thereby allowing roll 21 to strip crop material from the belts and prevent or reduce significantly the loss of crop material through the space between roll 21 and apron 32 during formation of a bale. Sledge assembly 20 is pushed outwardly towards its full bale position during bale formation as the crop material expands against rolls 21, 22, 23 and then subsequently is returned inwardly by apron 32 and spring 42 to the position shown in FIG. 1.

With the above description and general operation of baler 10 as a background, attention will now be directed to the wrapping system shown. As will become apparent, the wrapping apparatus of baler 10 is merely illustrative of one of the many types to which the features of the present invention are adaptable. For example, although a net wrapping system is shown, utilization of plastic wrap or twine would have no affect on the general aspects of the present invention.

To further enhance understanding of the various features of the present invention, it should be noted that even though a unified sledge and take up assembly is shown the invention is equally adaptable to other types of round baler configurations having wrapping apparatus operative in the vicinity of a pair of transverse rolls defining a slot through which a wrapping medium is introduced, e.g., a variable diameter round baler in which the take up arms and sledge are not integral, a round baler having a chamber with a fixed diameter, etc. Thus, the many advantages realized by the present invention are not limited to a round baler with a particular fixed or variable chamber configuration.

Figure 5:
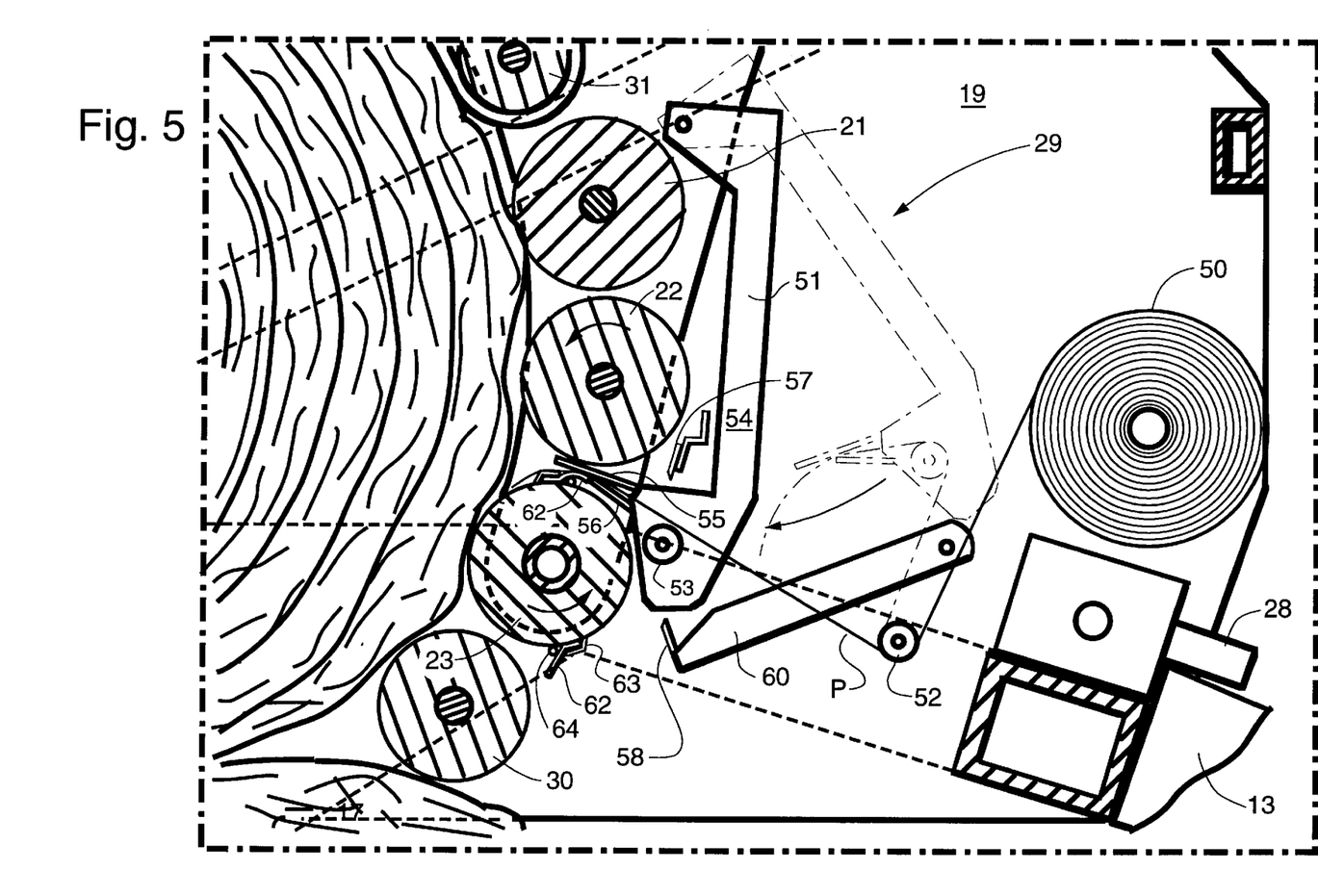
FIG. 5 is a view showing in detail those elements depicted within rectangular outline "5" in FIG. 3.
Figure 6:
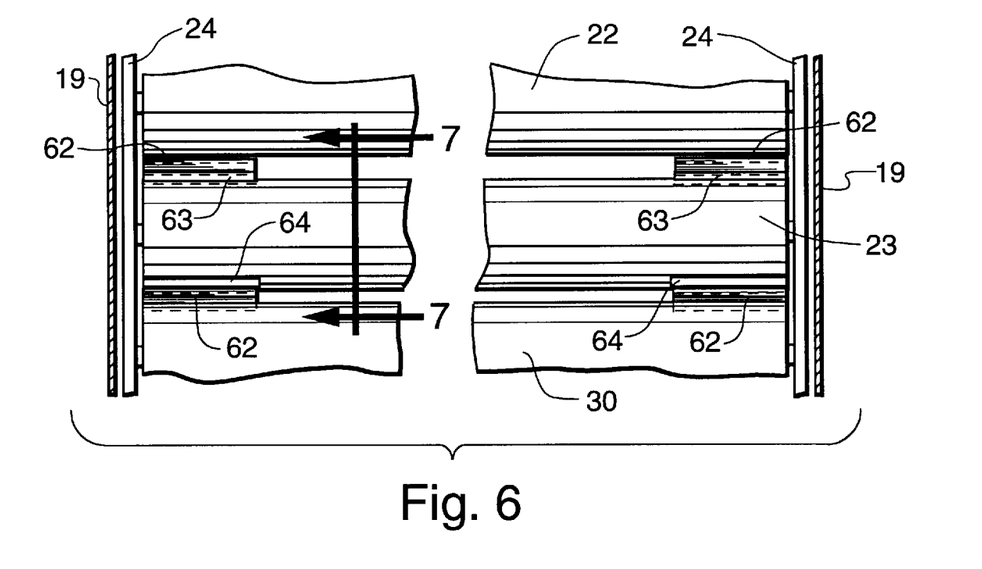
FIG. 6 is a partial view taken along lines 6—6 of FIG. 4, showing details of certain elements of the present invention.
Figure 7:
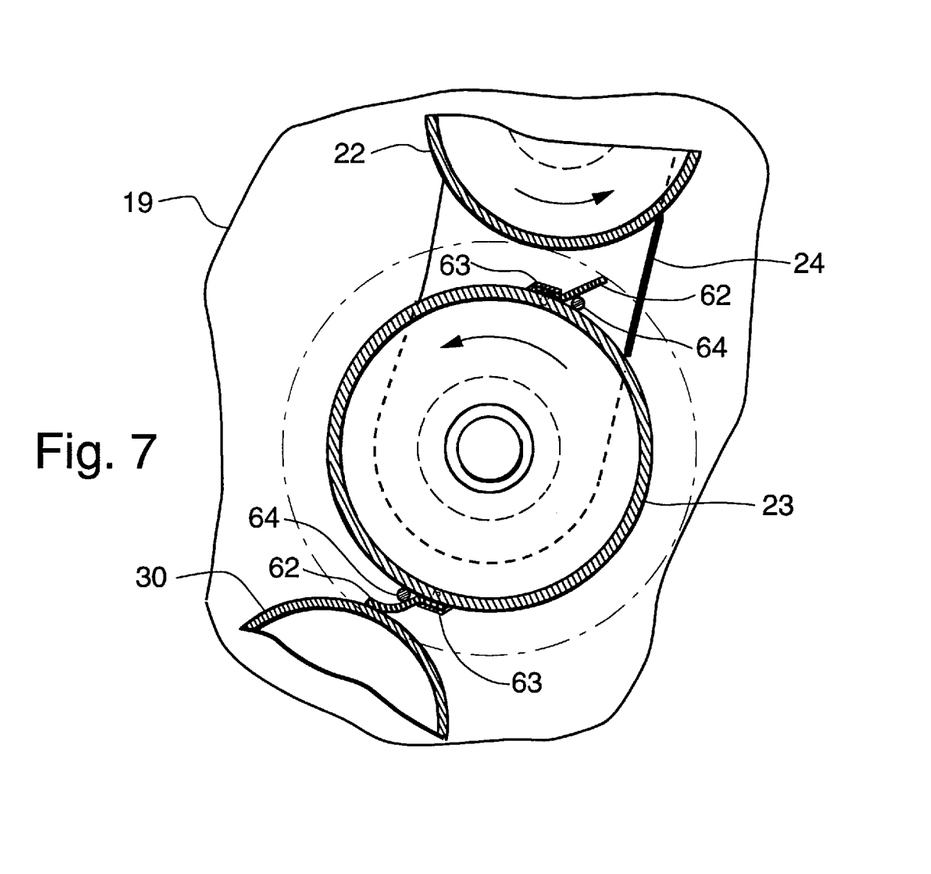
FIG. 7 is a view taken along line 7—7 of FIG. 6.

Now turning to FIGS. 5–7, with reference back to FIGS. 1–4, wrapping apparatus 29 more particularly comprises net insertion assembly 51 shown, firstly, in its inactive condition in FIG. 1, under conditions where a bale core is being initiated in the chamber, secondly, while still in its inactive condition, it is shown in FIG. 2 in the position it takes after the cylindrical package of crop material has reach the full chamber condition, and, lastly, net insertion assembly 51 is shown in the dispensing condition in FIG. 3. FIG. 4 shows the relationship of the various elements and assemblies of the baler after a cylindrical package of crop material has been wrapped and discharged rearwardly from the bale forming chamber. More particularly, FIGS. 1–4 show active net roll 50 operatively mounted for dispensing net, via wrapping apparatus 29, along path p, i.e., around guide roll 52 to spreader roll 53 mounted between side walls 54 of net insertion assembly 51, to clamping members 55, 56, (descriptively referred to as the duckbill). The net is finally severed by shearbar 57 and knife 58, mounted on arm 60, in a manner known in the art, e.g., severing systems of this type are shown in U.S. Pat. No. '672 and '968, referred to above. For the purposes of this description, the tail of the net is shown in FIG. 3 as being dispensed into the bale chamber via transverse clamping members 55, 56 of insertion assembly 51. An insertion assembly of this type is shown in the '968 patent, referred to above and hereby incorporated by reference. A twine arm assembly, shown in U.S. Pat. No. 5,581,973, issued Dec. 10, 1996 in the name of Kenneth R. Underhill is also adaptable for use with net insertion assembly 51. In the '973 patent both twine and net wrapping systems are contemplated on the same baler, which is a fixed diameter chamber baler employing rolls in combination with chains and slats to define the chamber. Likewise, even though net wrapping is illustrated for the purposes of this description, the insertion of twine or plastic webbing into the bale forming chamber is also contemplated, i.e., the duckbill may be utilized to insert and dispense either net or twine into the chamber. To this end, reference is again made to U.S. Pat. No. 5,581,973, assigned to a common assignee. The '973 patent, hereby incorporated by reference, shows apparatus for wrapping with net and/or twine, albeit, the baler is a fixed chamber type machine.

The crux of the present invention is to provide round baler wrapping apparatus with means that provide effective feeding of the wrapping material by engaging the material as the tail is being inserted into the bale forming chamber by the duckbill. This is accomplished in a round baler having the same general configuration as the baler described in the above paragraphs wherein, as shown in FIGS. 5–7, the conveying means on the sledge assembly comprise at least two transverse rolls each having a generally cylindrical outer surface. The rolls are mounted on the sledge assembly in spaced relationship along an arcuate path, and means rotate the rolls in a counter clockwise direction (see arrows) such that the outer surfaces thereof move in the same direction of travel as the apron. The improvement comprises resilient means extending from the lower transverse roll, i.e., the pivot roll 23, for intermittent contact with the wrapping material, be it net, twine or plastic, as it is being dispensed into the chamber by clamping members 55, 56 of the duckbill extending from insertion assembly 51, under conditions where a cylindrical package of crop material, formed in the chamber, is being rotated by the sledge rolls and apron 32. The resilient means referred to above comprise a plurality of flaps 62 held in place on the opposing ends (see FIG. 6) of the outer surface of roll 23 by clamps 63 and rods 64, the latter of which serves to hold flaps 62 in an outwardly extending posture. It should be noted that the lower clamping member 56 of the duckbill is inserted into the opening between transverse rolls 22, 23 such that it is disposed in operative relationship to the ends of flaps 62, whereby repeated positive engagement of flaps 62 with the tail, or tails, of the selected wrapping material being dispensed along path p is readily facilitated. In the case of net or plastic, the flaps engage the wrapping material in the vicinity of both edges and urge it inwardly as the flaps continue to intermittently engage it during the wrapping process. Likewise, if the wrapping medium being used is twine, the flaps engage the twine as it is being initiated at the outer edges of the cylindrical package of crop material in the case of twin twine arms. The flaps can be positioned selectively along roll 23 to accommodate the position at which the twine arms initiate wrapping. It is also contemplated that the flaps could be continuous along the full width of roll 23 to more aggressively engage the wrapping medium, under conditions where desirable, e.g., when feeding plastic around crop material with a relatively high moisture content.

Of the many implicit and explicit advantages of the present invention, one of the most important is the ability to function in a plurality of round baler configurations, i.e., rolls, belts and rolls, or even a chain and slat configuration, as long as the wrapping material is fed into the chamber through a transverse space between two adjacent bale forming elements, such as rolls or the equivalent thereof. Further, the chamber having a transverse space so defined, could be a fixed or variable diameter forming chamber machine, and the wrapping medium could be twine, net or plastic sheets or webbing.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a round baler for forming crop material into cylindrical bales, said baler having
    a main frame,
    a tailgate pivotally connected to said main frame, said tailgate operative between a closed position during which a bale is being formed, and an open position during which a formed bale is being discharged,
    a sledge assembly mounted on said main frame for movement between a bale starting position and a full bale position, said sledge assembly including conveying means having a crop engaging surface extending transversely of said main frame,
    said conveying means comprising two transverse rolls,
    means for mounting said two transverse rolls in spaced adjacent relationship, said rolls each having a generally cylindrical outer surface defining a transverse slot therebetween,
    an apron supported along a continuous path on said main frame and on said tailgate by a plurality of rotatable guide members, said apron path having an inner course that cooperates with said conveying means on said sledge assembly to define a bale forming chamber,
    drive means for moving said apron along said continuous path,
    means for rotating said two transverse rolls such that the outer surfaces thereof move in the same direction of travel as said apron,
    a supply of wrapping material,
    a dispensing assembly including means for dispensing wrapping material from said supply of wrapping material into said chamber through said slot between said two transverse rolls for wrapping the outer surface of said cylindrical package of crop material to form a round bale of crop material, and
    a pickup for feeding crop material into said chamber, the improvement comprising
        feed assist means extending from one of said two transverse rolls for intermittent contact with said wrapping material for urging it toward said bale forming chamber as it is being dispensed through said slot.

2. A round baler as set forth in claim 1 wherein said feed assist means comprise a transverse resilient element.

3. A round baler as set forth in claim 1 wherein said feed assist means comprise a pair of resilient elements.

4. A round baler as set forth in claim 1 wherein said feed assist means comprise a plurality of resilient flaps extending from one of said two transverse rolls for intermittent contact with said wrapping material.

5. A round baler as set forth in claim 4 wherein said feed assist means further comprise means for securing said flaps transversely along said one of said two transverse rolls.

6. A round baler as set forth in claim 5 wherein said feed assist means further comprise means for holding said flaps to extend rearwardly with respect to the direction of travel of said outer surface of said one of said two transverse is rolls under conditions where said roll is rotating.

7. In a round baler for forming crop material into cylindrical bales, said baler having
    a main frame,
    a plurality of conveying elements supported on said main frame for defining a bale forming chamber,
    said conveying elements each having a crop engaging surface extending transversely of said main frame,
    said conveying elements comprising at least two transverse rolls mounted in spaced relationship along an arcuate path, said rolls each having a generally cylindrical outer surface, means for rotating said transverse rolls such that the outer surfaces thereof move in the same direction of travel, a supply of wrapping material, a dispensing assembly including means for dispensing wrapping material from said supply of wrapping material into said chamber between said transverse rolls for wrapping the outer surface of said cylindrical package of crop material to form a round bale of crop material, and a pickup for feeding crop material into said chamber, the improvement comprising feed assist means extending from one of said transverse rolls for intermittent contact with said wrapping material as it is being dispensed into said chamber under conditions where the outer surface of a cylindrical package of crop material is being wrapped in said chamber.

8. A round baler as set forth in claim 7 wherein said feed assist means comprise a transverse resilient element.

9. A round baler as set forth in claim 7 wherein said feed assist means comprise a pair of resilient elements.

10. A round baler as set forth in claim 7 wherein said feed assist means comprise a plurality of resilient flaps extending from one of said two transverse rolls for intermittent contact with said wrapping material.

11. A round baler as set forth in claim 10 wherein said feed assist means further comprise means for securing said flaps transversely along said one of said two transverse rolls.

12. A round baler as set forth in claim 11 wherein said feed assist means further comprise means for holding said flaps to extend rearwardly with respect to the direction of travel of said outer surface of said one of said two transverse rolls under conditions where said roll is rotating.

13. A round baler for forming crop material into cylindrical bales comprising in combination a main frame, a plurality of conveying elements supported on said main frame for defining a bale forming chamber, said conveying elements each having a crop engaging surface extending transversely of said main frame, said conveying elements comprising at least two transverse rolls mounted in spaced relationship along an arcuate path, said rolls each having a generally cylindrical outer surface, means for rotating said transverse rolls such that the outer surfaces thereof move in the same direction of travel, a supply of wrapping material, a dispensing assembly including means for dispensing wrapping material from said supply of wrapping material into said chamber between said transverse rolls for wrapping the outer surface of said cylindrical package of crop material to form a round bale of crop material, a pickup for feeding crop material into said chamber, and feed assist means extending from one of said transverse rolls for intermittent contact with said wrapping material as it is being dispensed into said chamber under conditions where the outer surface of a cylindrical package of crop material is being wrapped in said chamber.

14. A round baler as set forth in claim 13 wherein said wrapping material comprises net.

15. A round baler as set forth in claim 14 wherein said feed assist means comprise a transverse resilient element.

16. A round baler as set forth in claim 14 wherein said feed assist means comprise a plurality of resilient flaps extending from one of said two transverse rolls for intermittent contact with said net.

17. A round baler as set forth in claim 16 wherein said feed assist means further comprise means for securing said flaps transversely along said one of said two transverse rolls.

18. A round baler as set forth in claim 17 wherein said feed assist means further comprise means for holding said flaps to extend rearwardly with respect to the direction of travel of said outer surface of said one of said two transverse rolls under conditions where said roll is rotating.

\* \* \* \* \*